United States Patent [19]
Wrobel et al.

[11] Patent Number: 5,777,830
[45] Date of Patent: Jul. 7, 1998

[54] BELT-DRIVEN TAPE CARTRIDGE HAVING INCREASED TAPE CAPACITY

[75] Inventors: Andrew Wrobel, La Jolla; James A. Eggebeen, San Diego; Robert L. Derhaag, Temecula, all of Calif.

[73] Assignee: Gigatek Memory Systems, La Costa, Calif.

[21] Appl. No.: 728,312

[22] Filed: Oct. 9, 1996

[51] Int. Cl.⁶ ...................................... G11B 23/02
[52] U.S. Cl. .................................................. 360/132
[58] Field of Search .................................. 360/132

[56] References Cited

U.S. PATENT DOCUMENTS

| | | | |
|---|---|---|---|
| 3,692,255 | 9/1972 | Von Behren | 242/192 |
| 4,008,490 | 2/1977 | Lemelson | 360/94 |
| 4,074,876 | 2/1978 | Gourley | 242/199 |
| 4,146,194 | 3/1979 | Majicek | 242/192 |
| 4,172,569 | 10/1979 | Newell | 242/192 |
| 4,205,808 | 6/1980 | Hurtig et al. | 242/192 |
| 4,219,169 | 8/1980 | Majicek | 242/192 |
| 4,262,860 | 4/1981 | Hurtig et al. | 242/192 |
| 4,275,424 | 6/1981 | Maxey | 360/85 |
| 4,447,019 | 5/1984 | Nagorski | 242/192 |
| 4,474,342 | 10/1984 | Nater | 242/192 |
| 4,498,112 | 2/1985 | Georgens et al. | 360/96.5 |
| 4,556,923 | 12/1985 | Olmsted | 360/93 |
| 4,586,095 | 4/1986 | Olmsted | 360/93 |
| 4,622,606 | 11/1986 | Rudi | 360/96.5 |
| 4,673,995 | 6/1987 | Spiegelstein | 360/93 |
| 4,786,996 | 11/1988 | Ohtani et al. | 360/94 |
| 4,803,575 | 2/1989 | Nishimura et al. | 360/94 |
| 4,807,067 | 2/1989 | Spiegelstein | 360/93 |
| 4,853,805 | 8/1989 | Baranski | 360/94 |
| 5,016,127 | 5/1991 | Inoue et al. | 360/94 |
| 5,109,308 | 4/1992 | Kukreja et al. | 360/93 |
| 5,121,271 | 6/1992 | Sakumoto et al. | 360/94 |
| 5,239,436 | 8/1993 | Aizawa et al. | 360/132 |
| 5,240,200 | 8/1993 | Nishimura et al. | 242/199 |
| 5,323,280 | 6/1994 | Rudi | 360/96.5 |
| 5,335,131 | 8/1994 | Sato et al. | 242/347 |
| 5,440,435 | 8/1995 | Busengdal et al. | 360/96.5 |
| 5,543,992 | 8/1996 | Hu et al. | 360/132 |
| 5,559,655 | 9/1996 | Saitou | 360/132 |
| 5,582,358 | 12/1996 | Shin | 360/132 |
| 5,610,788 | 3/1997 | Standiford | 360/132 |

FOREIGN PATENT DOCUMENTS

| | | |
|---|---|---|
| 4209380 | 7/1992 | Japan. |
| 8255458 | 10/1996 | Japan. |
| WO9531811 | 11/1995 | WIPO. |

Primary Examiner—A. J. Heinz
Attorney, Agent, or Firm—Brown, Martin, Haller & McClain, LLP

[57] ABSTRACT

A belt-driven tape cartridge having more internal tape storage capacity than prior art cartridges adhering to a standard, but having the same outside dimensions as such a standard cartridge. The invention optimizes internal tape storage capacity in a approximately standard quarter inch cartridge by optimizing the geometric configuration and placement of internal tape guide rollers, repositioning internal side walls, and optimizing the size of the tape drive roller. Compared to the standard, the tape guide rollers are reduced in diameter and moved further away from the center line of the tape reels. Also in comparison to the standard, the side walls are also repositioned further away from the radial center of the tape reels. Optionally, the drive interface portion of the belt drive roller is decreased in size, while the required linear velocity of the tape is maintained by proportionally decreasing the radius of the belt interface portion of the belt drive roller.

27 Claims, 4 Drawing Sheets

BELT-DRIVEN TAPE CARTRIDGE HAVING INCREASED TAPE CAPACITY

BACKGROUND OF THE INVENTION

1. Field of the Invention

The present invention relates generally to magnetic tape data storage media for computer systems and, more specifically, to an improvement in tape cartridge storage capacity.

2. Description of the Related Art

The belt-driven tape cartridge described in U.S. Pat. No. 3,692,255, issued to Von Behren, is used in conjunction with a tape drive unit to store and retrieve data in a computer system. The cartridge includes a base plate and a housing. Two spools are rotatably mounted in the housing on pins perpendicular to the base plate. Like the spools of other tape recording systems, the spools of the Von Behren cartridge comprise a cylindrical hub with two flanges having diameters greater than that of the hub. The tape is wound around the hub between the flanges. The hubs are aligned on an axis parallel to the front wall of the housing in which the tape drive and tape read/write openings are located. The tape is driven between the hubs by means of a flexible elastic drive belt that extends around a drive roller at the front of the housing and contacts the tape on the two hubs before extending around a pair of corner rollers. The drive belt moves in response to rotation of the drive roller. When the front of the cartridge is inserted through the drive door, a capstan in the drive engages the drive roller and a read/write head in the drive engages the tape. In operation, the drive roller rotates in response to rotation of the capstan, and the tape moves past the head in response to rotation of the drive roller.

The original Von Behren cartridge was rectangular and measured 5¼ inches in width across the front of the housing. Practitioners have since developed a cartridge that is about 3½ inches in width and it is commonly referred to as a "minicartridge." The structure of a minicartridge is essentially the same as that of a the larger cartridge described above, but it has proved very popular because of its small size. A correspondingly sized mini-drive is used in conjunction with a minicartridge. In either case, each respective cartridge must have standard housing dimensions (e.g. depth and width) to interface properly with commercially popular tape drives. The baseplate length and width defines the area consumed by a cartridge at rest and it is referred to as the cartridge "footprint."

A collection of standards for data cartridges and drives is administered by Quarter-inch Cartridge (Q.I.C.) Drive Standards, Inc. of Santa Barbara, Calif. Q.I.C. is an international trade association incorporated in 1987. Its primary purpose is to promote standardized data storage technology among computer users, resellers, dealers, industry analysts, trade and technical press, and the formulation of development standards for compatibility among various manufacturers' drives, cartridges, and subsystems. Q.I.C. technology includes single-capstan drive units containing magnetic read/write heads and electronics for read/write, motion control, and system interface functions and data cartridges that work in these drive units. These data cartridges, such as the minicartridge, contain a certain amount of quarter-inch magnetic-coated tape, and the above-described integral tape motion and guidance mechanisms. It should be noted that quarter-inch refers to the width of the tape, which was originally that size. Nevertheless, some tape being slight wider, even closer to one-third of an inch is still referred to as quarter-inch tape because it is fully compatible with modern standards for minicartridges capable of housing either side. The particular amount of tape stowed in a tape cartridge is usually a function of the length of tape that can be stowed on the hubs. Different Q.IC. standard minicartridges are capable of stowing different lengths. For example, the earliest unrecorded magnetic tape minicartridge standard still available from Q.I.C. is the QIC-159 standard, describing a cartridge containing 400 ft. of tape, while the QIC-167 standard describes a tape cartridge capable of housing up to 1000 ft. of tape.

icartridges are particularly popular with network administrators and others who are responsible for backing up and archiving data from server hard disk drives. Q.I.C. technology, in particular, has been extremely popular because it has been proven over time to be reliable and cost-effective. Further, it supports backward read compatibility to the largest installed base of tape drives in the world. Additionally, Q.I.C. which includes major manufacturers of drives and cartridges is constantly developing new standardized technology for upward migration in terms of storage capacity and data-transfer rate. Q.l.C Drive Standards, Inc. estimates that the worldwide installed base of Q.I.C. tape drives now exceeds 13 million, and more than 200 million data cartridges have been sold. The growth of tape drives is expected to grow on the order of at least 4 million units per year for the next few years. Of course this means a significantly greater amount of cartridges will also be needed.

Many data cartridges built to Q.I.C. minicartridge standards have enjoyed commercial success, particularly those built according to the QIC-153 and QIC-163 standards. Though the minicartridges built according to those standards are different, each describes a minicartridge for unrecorded magnetic tape capable of stowing 425 ft. of tape. The minicartridges built according to these standards have been extremely popular because they are compact and economical. Due to the market volume, and the maturity of the technology, the minicartridges can be built at low cost. Because there are many cartridge vendors, the market is very competitive and the consumer's price is low compared to other data storage means having the same capacity.

To provide increased storage capacity over cartridges made in compliance with QIC-153 and QIC-163 standards, Minnesota Mining and Manufacturing Company produces both a drive and extended-length minicartridge under the trademark Travan®. The drive and the minicartridge are described in International Patent Application Publication No. WO 95/31811, filed by the 3M Company of St. Paul Minn. This minicartridge is more fully completely described and updated in two Q.I.C. standards, QIC-161 and QIC-162. The cartridge has an extended-length portion in the back and is wider near the door of tape drive than minicartridges complying with the QIC-153 and QIC-163 standard. The extended-length and greater width are used for stowing more tape than in these minicartridges than possible in the smaller minicartridges.

A Travan®-accommodating drive can also be used in conjunction with ordinary minicartridges adhering to the QIC-153 and QIC-163 standard. The door bezel of the Travan® drive has a special shape that accommodates both Q.I.C. cartridges and Travan® cartridges. The housing of the Travan® cartridge has a cross-sectional shape that corresponds to the shape of the opening in the door bezel of the drive. The cross-sectional shape is defined by a groove at each top edge of the cartridge extending from the front to the rear of the cartridge. The Travan® cartridge is described in pending International Patent Application Publication No.

WO 95/31811. When inserted in the door of the drive, the grooves engage corresponding corners in the bezel as well as rails on the door itself. The concept of providing a drive that accommodates cartridges of two different sizes is described in the above-referenced International Patent Application.

Unfortunately, there are two primary disadvantages associated with the Travan® cartridge. One is that the extended length and greater width produce a footprint that is much bigger than the footprint of smaller Q.I.C. minicartridges, such as the QIC-153 and QIC-163 cartridges. The incompatibility of the footprints mean that the two different types of minicartridges cannot easily be stored. In particular, a Travan® minicartridge cannot be stacked with a QIC-153- or QIC-163-type minicartridge. In short, tape drive operators must accommodate two distinctly different shapes of minicartridges, which is cumbersome and inconvenient.

Another problem is that the Travan® minicartridge is very expensive. It is currently being offered to consumers for almost 350% of the price of the 425 foot tapes, even though it offers only about a 75% increase in capacity. Nevertheless, the increased price is borne by the market because there is not another minicartridge offering more capacity than available with the 425 feet of tape at a lower price than the Travan® cartridge. Thus, there is a need for a new minicartridge that has a footprint similar in size to minicartridges built to the QIC-153, QIC-163, but offering more storage capacity, and while being more economically feasible than the QIC-161-, QIC-162- or Travan®-type minicartridge.

The Travan®-type minicartridge is probably costly to build because it is still a new technology without the opportunity to amortize the cost of new manufacturing tools over time. Further, it has little manufacturing interchangeability with the more mature smaller minicartridge and therefore cannot benefit from the smaller minicartridges parts or manufacturing tools. In view of these problems, it would clearly be an advancement in the art to provide increased storage capacity in a tape cartridge adhering closely to the QIC-153 or QIC-163 standards to obviate the interchangeability problems discussed above, as well as reducing cost to the manufacturer.

SUMMARY OF THE INVENTION

This invention is a belt-driven tape cartridge having a housing with outside dimensions substantially identical to the QIC-153 and 163 standards, but with more tape storage capacity. In particular, the housing includes a top cover and a base plate, the area of the base plate defining a cartridge footprint. Only the footprint varies from the standard, and the area difference is less than one percent, yet the internal tape storage capacity is increased by approximately about fifty percent. The invention increases the internal tape storage capacity in a cartridge of substantially the same size as the industry standard for a minicartridge by optimizing the geometric configuration and placement of internal tape guide rollers, repositioning internal side walls, and optimizing the size of the tape drive roller. The guide rollers are reduced in diameter and moved further away from the center line of the tape hubs, compared to the QIC-153 and 163 standard cartridges. Again, in comparison to these standard cartridges, another aspect of this invention is repositioning the side walls further away from the radial center of the tape reels.

In an alternative embodiment, the drive portion of the drive roller (puck) is decreased in size, while the required linear velocity of the tape is maintained by proportionally decreasing the radius of the belt portion of the puck. Each of these enhancements, singularly or in combination with any of the others, increases the space available for stowing tape on the drive wheels.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings in which identical numbers in various views represent the same or similar elements, and wherein.

DESCRIPTION OF PREFERRED EMBODIMENTS

Figure 1:
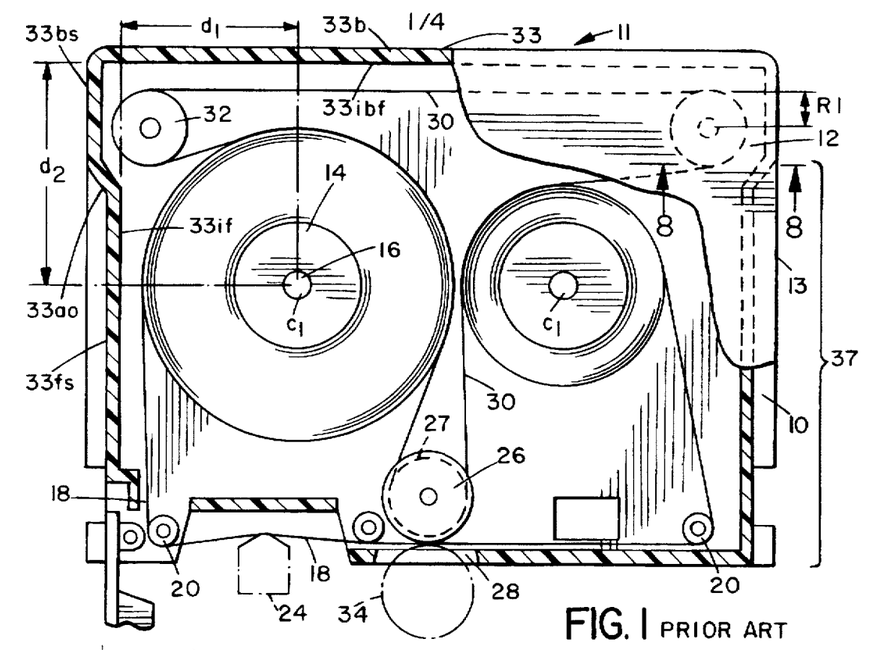
FIG. 1 is a plan view of a prior art Q.I.C. standard tape cartridge in a prior art compatible tape drive.

FIGS. 1 shows a prior art minicartridge 11 built according to QIC-153 or 163 standards engaged in a drive (not shown but portions thereof are shown in phantom view) for reading and writing of recording tape 18 by tape head 24 that is part of the drive. As illustrated in FIG. 1, a data cartridge 11 comprises a metal base plate 10, a transparent plastic cover 12, and a pair of tape spools 14. Together base plate 10 and cover 12 form cartridge housing 13. Spools 14 are rotatably supported on the base plate 10 by cylindrical spindles 16 that are fixed perpendicularly into base plate 10. A magnetic recording tape 18 is wound around spools 14 at opposite ends and extends between spools 14 along a predetermined path around various fitted tape guides 20. The path extends across a tape head opening 22 in the front wall of the cartridge to provide access for a tape head 24.

A belt driving roller 26 is mounted adjacent a drive opening 28 in the front wall of the cartridge. A drive belt 30 extends around belt driving roller 26 and around belt guide rollers 32, which are rotatably mounted on base plate 10. The belt guide roller 32 has a circular shape with a radius of R1. Its surface area or base area is $\pi(R1)^2$. The ratio of its base area to the base plate width is a useful measurement because it describes how much space is consumed by the belt guide roller. The inventors have critically recognized that area consumed by the belt guide roller itself is, in turn, not available for the storage of tape. In operation, the capstan 34 of the tape drive fictionally rotates belt driving roller 26 through drive opening 28 in the front wall of the housing. Belt driving roller 26, includes a smaller portion 27 that is rigidly connected by a common shaft for moving the belt in response to rotation of the capstan. The cartridge is fully described in Q.I.C. standard 153, a copy of which is included as an appendix to this application. A cartridge, in compliance with QIC-153, revision D, holds about 425 feet of tape. A copy of this standard is included as a paper appendix with this patent application. Cover 12 is attached to base plate 10 by fasteners (not shown) that pass through posts disposed between the top portion of cover 12 and base plate 10. The tape is contained inside the outer side-support walls 33 of the cover. In the prior art cartridge the wall 33 has an abrupt angular-offset portion 33ao that offsets back-side portion 33bs from front-side portion 33fs. The wall is symmetrically apportioned on the sides, so that an identical back-side, offset, and front-side portion exist on both sides. The inventors of the present invention have critically recognized that the placement of the walls, and in particular the angular offset of portion 33fs relative to 33bs limit the amount of tape that may be stowed on the spools. In other words, the span distance $d_1$ between each inner-face portion 33if of wall 33 to each respective spindle center $c_1$ is a critical dimension for determining how much tape can be place on each spool because eventually tape wound on a particular spool will abut one of the inner-face portions. Thus, the inventors have recognized that increasing the distance $d_1$ is desirable. However, in the prior art the entire portion 37 of the base plate must be exposed for engagement and alignment with the compatible tape drive. Therefore, the distance $d_1$ is fixed and unchangeable in the prior art.

The inventors have also critically realized that the location of back portion 33b, limits the space available for stowing tape in the cartridge housing in the prior art cartridge. It is a further recognition of the inventors that the span distance $d_2$ measured from the center $c_1$ of each spool 14 to inner-back-face 33ibf is also another limiting factor. However it is an indirect limiter because it effects the location of guide rollers 32 and the portion of the elastic belt spanning between each guide roller. Unfortunately, in this prior art arrangement, the entire cartridge fits inside of the drive and therefore the distance $d_2$ is not variable because the position of the back portion of the wall is fixed.

Figure 2:
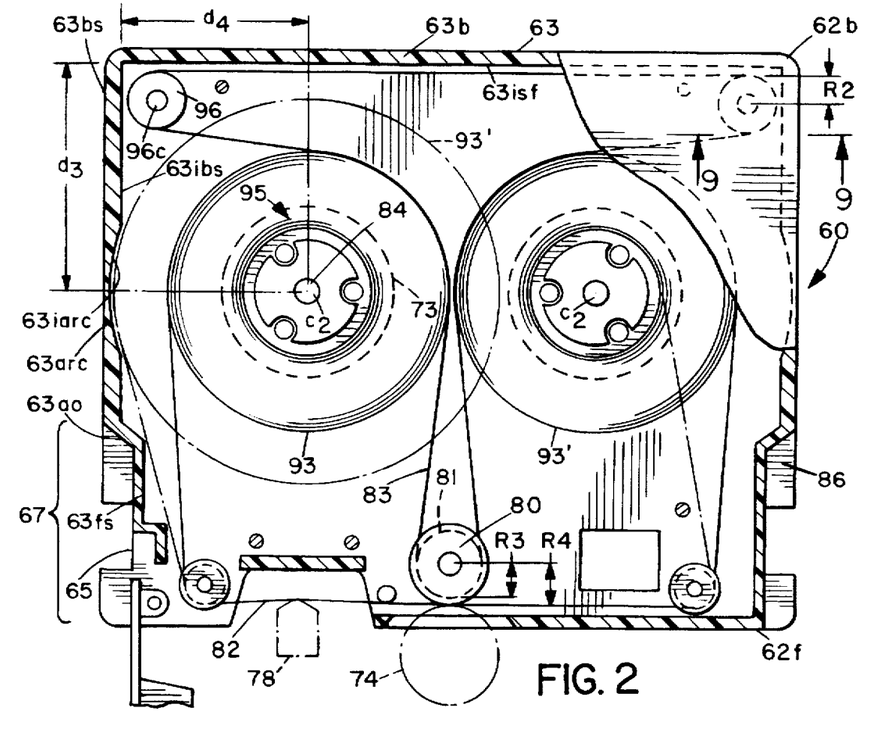
FIG. 2 is a plan view of the cartridge of the present invention in a compatible prior art Travan®-type tape drive.

FIG. 2 shows the cartridge 60 of the present invention in a compatible tape drive (portions thereof shown in phantom). Substantially, the operational interface between the recording tape 82 and the tape head 78, and the belt driving roller 80 and drive capstan 74 is identical to the relationship between equivalent elements in prior art cartridge 11 and the compatible drive portions shown in FIG. 1. Belt driving roller 80 includes smaller portion 81 that directly turns belt 83 just like elements 26 and 27 of the prior art (FIG. 1). Nevertheless, the cartridge 60 is configured to work in a tape drive compatible with a Travan®-type cartridge rather than one compatible with cartridge 11, which enables operational advantages that allow approximately about 50% more length of tape to be stowed on hubs 71.

A Travan®-type cartridge is described in detail relevant to the present invention with reference to FIG. 5 below, but is also fully described in the QIC-161 standard. The interaction of cartridge 60 and a compatible Travan®-type drive is described with reference to FIGS. 6 and 7, below. More detailed information about such a drive, though not critical to the operation of this invention, may be obtained from 3M corporation of St. Paul, Minn. and Q.I.C. Inc. of Santa Barbara, Calif.

The operational advantages referenced above are now described.

Wall 63 of the cartridge is apportioned into front-side portion 63fs located proximate to and having clearance for notch guide 65 and for cartridge alignment area 67 of base plate 86. Each align and engage with the drive in a manner described in reference to FIGS. 6 and 7. Because cartridge 60 is compatible with a Travan®-type drive, it is not necessary to expose any more of base plate 86 than clearance area 67.

Figure 5:
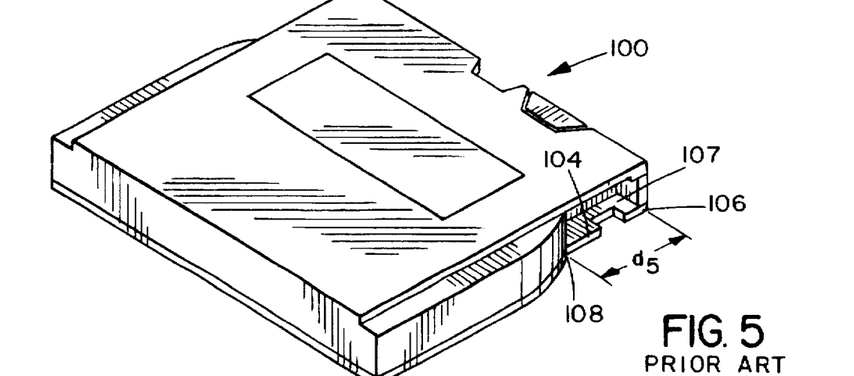
FIG. 5 is a plan view of a prior art Travan®-type cartridge.

Referring to FIG. 5, a prior art Travan®-type cartridge 100 is shown for purposes of clarifying the preferred span of clearance area 67 of base plate 86 for the inventive cartridge of FIG. 2. The cartridge 100 has an exposed portion 102 of base plate 104 spanning a distance $d_5$ from one exposed end 106 to the other 108. This distance is specified in the standard QIC-161, included as an appendix to this application. Nevertheless, while it is best to size clearance area 61 with a span equal to $d_5$, the distance may be varied as long as empirical testing shows that the base plate notch engages firmly in the Travan®-type tape drive.

Referring again to FIG. 2, an angular offset portion 63ao offsets the front-side portion from a back-side portion 63bs. Importantly the offset is angled outward, away from the center of the hubs $c_2$ and the tape flange 73 providing a distance $d_4$ between the center of each spindle 84 and the inner-side-face 63isf of back-side wall portion 63bs. Of course, due to the circular geometry, each respective hub center $c_2$ is coincident with the vertex of the hub's center axis about which it rotates. Preferably, the back-side wall portion includes an arcuate portion 63arc that describes the arcuate path coincident with the greatest circumferential area of a respective tape pack 93 formed by recording tape 82 being wound around each respective hub 71. Thus, at inner-side-face 63iarc the distance $d_4$ is increased by a slight amount equal to the radius of curvature of arcuate portion 63arc. Flange 73 combined with hub 71 forms tape spool 95. Because the distance $d_4$ is substantially greater than distance $d_1$ the length of tape spooled around each tape pack 93 can be significantly greater than the length of tape stowed on spools 14 of prior art cartridge 11. For example, tape pack 93' illustrates the potential amount of tape that can be held on a spool due to this invention.

Back wall portion 63b is moved back about 0.25 inches because it is not critical that cartridge 60 be fully contained in the tape drive. Thus, the distance $d_3$ is significantly greater than the analogous distance $d_2$ of cartridge 11. Yet, with only de minimis variation in the length of base plate 86 from and base plate 10, the cartridges 11 and 60 have housings 13 and 85 that are substantially the same size.

Figure 3:
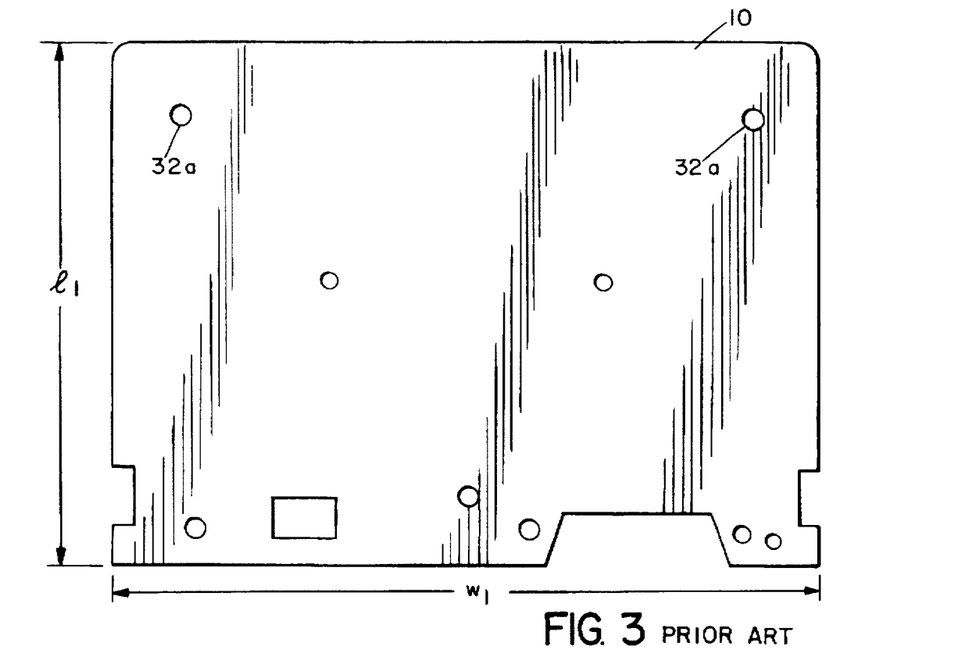
FIG. 3 is a plan view of a prior art base plate for the prior art cartridge of FIG. 1 showing the position of apertures and openings for receiving guide rollers, drive rollers, spindles, and guide posts.
Figure 4:
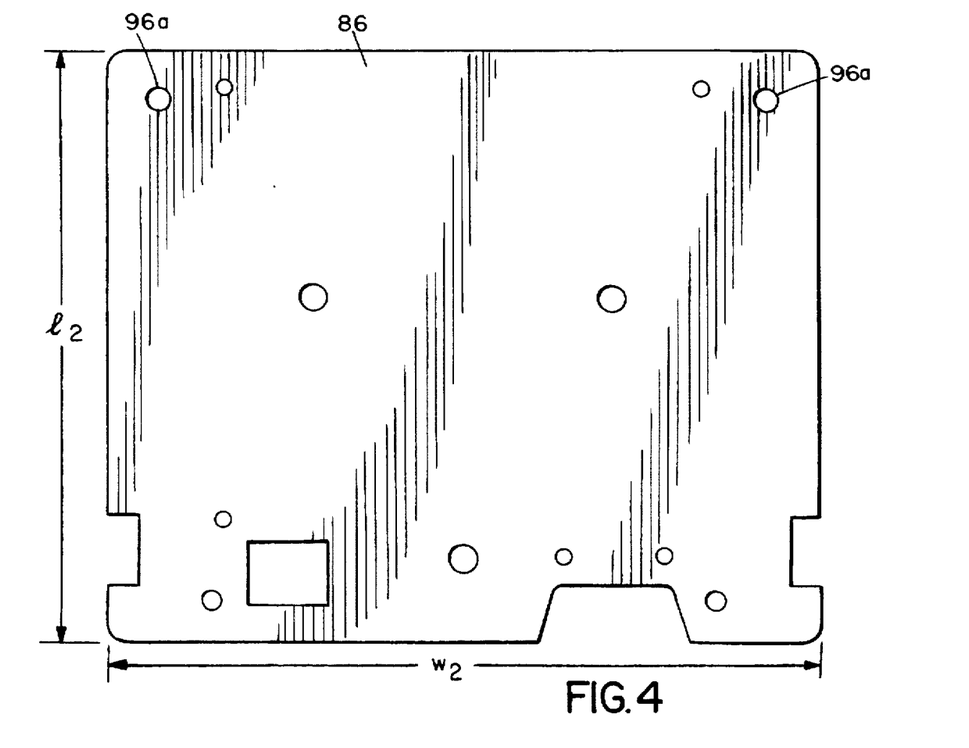
FIG. 4 is a plan view of the base plate for the cartridge of FIG. 2 showing the position of apertures and openings for receiving guide rollers, drive rollers, spindles, and guide posts.

Referring to FIGS. 3 and 4, the difference between the base plates is illustrated. In particular, it is significant that the areas of base plates 86 and 10 are less than 1% different. The respective widths $w_1$ and $w_2$ are preferably identical and the length $l_2$ of the new cartridge is only about 0.25 inches greater than the length $l_1$ of the prior art cartridge. In a preferred embodiment width $W_1$ is about 3.19 inches to maintain the appropriate interface with the drive. Yet, the cartridge 60 has surprising superiority over the prior art because it has been shown to be able to store about 625 feet of tape, which is approximately about 50% more than the prior art cartridge while the respective housings have significant compatibility because they are almost identically sized.

The inventors have further recognized that it may be possible to maintain the critical linear velocity of the tape while reducing the size of the belt driving roller compared to the belt driving roller specified in the QIC-153 industry standard. It is necessary to reduce smaller portion 81 as well to maintain the critical velocity. Such a reduction will offer the advantage of additional room for tape capacity. Belt driving roller 80 has a largest radius of R4 and the smaller portion that contacts the belt has a radius of R3. Both R3 and R4 are smaller than respective parts of roller 26 of the prior art. This means more area is available for tape storage in the invented cartridge.

Referring to FIGS. 2, 3, and 4, a further advantage of the present invention is shown. Each respective belt guide roller 96 has a guide pin defining center 96c that is positioned farther from the center of spindle 84 in a translation direction from front portion 62f to back portion 62b than the center of belt guide roller 32 is positioned from the center of spindle 16. This is made possible by the greater distance $d_3$ discussed above, due to the length of base plate 86 and its enable of placement of wall potion 63b farther from drive roller 80 than wall portion 33v is positioned relative to drive roller 26. Additionally, each center 96c is centered farther from the center of spindle 84 in a side to side direction of translation than the center of belt guide roller 32 is positioned from the center of spindle 16. This can most easily be appreciated with reference to FIGS. 3 and 4, in which the positions of aperture 32a and aperture 96a of respective base plates 10 and 86 are different. This is in accordance with the geometric differences described above with reference to the drive rollers.

Each belt guide roller 96 has a circular section that at least in part is in contact with the belt and its radius is R2. R2 is understood to extend from the center point, even though the circular portion has an aperture therethrough and is not actually a continuous solid piece. This simplification is done so that the area is easier to calculate for comparison purposes with the prior art. Thus, with this assumption, the area of this circular portion is simply $\pi(R2)^2$. Applying the same principles and assumptions to the prior art, the area $\pi(R2)^2$ is smaller than the prior art area $\pi(R1)^2$, even though the respective base plates have substantially identical widths, $W_1$ and $W_2$. Thus, the ratio of $\pi(R2)^2$ to width $W_2$ is smaller than the ratio of prior art $\pi(R1)^2$ to width $W_1$. This means more space is available for storing tape in the new cartridge of this invention.

Most prior art commercial embodiments of belt guide rollers for cartridges built in accordance with have very similarly sized radiuses (R1). Following are values (in inches) obtained from measuring R1 for commercially available belt guide rollers built in accordance with the QIC-153 industry standard: (1) 0.215 (Sony); (2) 0.214 (Verbatim); (3) 0.216 (Megamedia); (4) 0.425 (Gigatek, the assignee of this invention). The inventors have been able to reduce the radius R2 of the new belt guide rollers 96 to about 0.390 inches. Thus, disregarding units, the ratio of the numerical value of the area $\pi(R2)^2$ to width $W_1$ is about 1:6, i.e. the area is about 0.48 and the width is about 3.19. The same prior art ratio, of $\pi(R1)^2$ to width $W_1$ is about 1:5. Thus, there is a significant increase in capacity available for storing new tape.

Such a change is counter-intuitive to one skilled in the prior art, because decreasing the size of the belt guide roller leads to increased tension on the tape, since the mechanical advantage of the smaller roller is much less than the larger roller. Because of this problem, the prior art teachings have always suggested that a smaller roller is disadvantageous. Nevertheless, the inventors have recognized that changing the geometry of other components in the cartridge may compensate for this disadvantage and have achieved unexpected superiority over the prior art by reducing the radius of the new belt guide roller.

Figure 6:
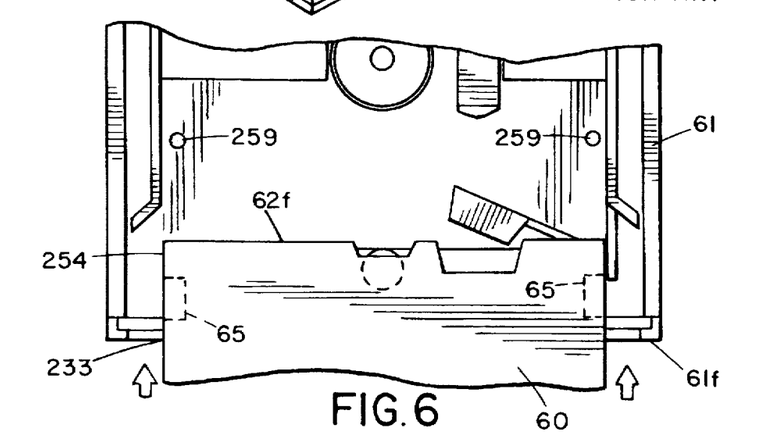
FIG. 6 is a top view of the cartridge of FIG. 2, showing insertion thereof into the compatible prior art Travan®-type tape drive.
Figure 7:
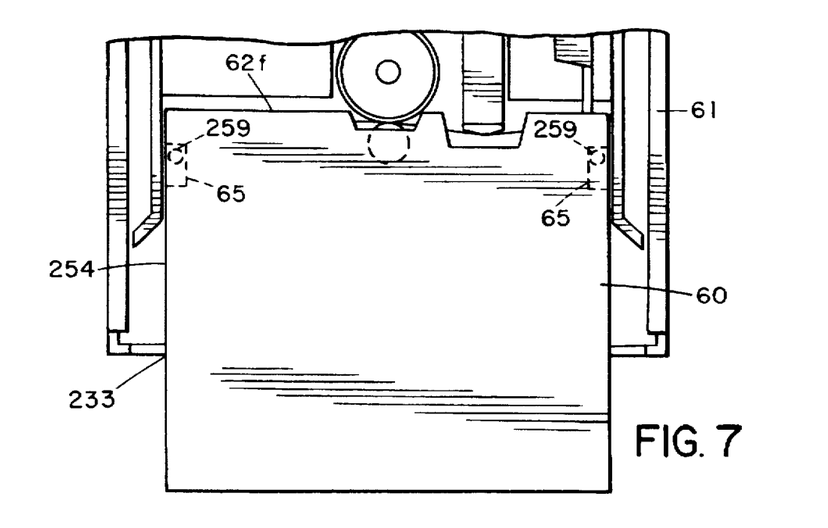
FIG. 7 is a top view of the cartridge of FIGS. 2 and 6, showing the cartridge fully inserted in the drive of FIG. 6.

FIGS. 6–7 illustrate the insertion of cartridge 60 into the drive 61. Principally, the cartridge is inserted identically to the prior art cartridges of both the QIC-153 and 161 standards. The front portion 62 of cartridge 60 is aligned with bezel 200 and a drive door (not shown for simplicity) and then inserted. Inserting the front portion 62f of cartridge 60 flips a drive door (not shown) upwardly and allows cartridge 60 to be extended through bezel 200. A sliding assembly (not shown) engages the tape door 271 and begins to open it in the conventional manner of the known Travan®-type cartridge.

When cartridge 60 is fully inserted in drive 61, as illustrated in FIG. 7, its edges 254 are retained between bezel edges 33. Also, in this position, two balls 259 biased by leaf-springs (not shown) 261 each engage respective corresponding notches 65 in the known manner of the Travan®-type cartridge, thereby retaining it in drive 61.

Figure 8:
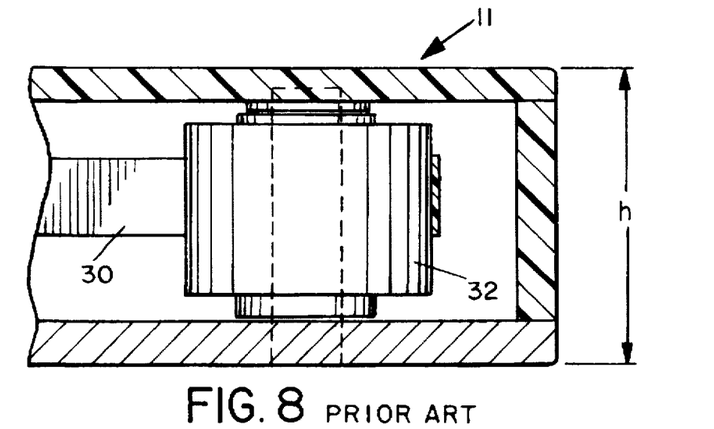
FIG. 8 is an enlarged sectional view taken on line 8—8 of FIG. 1.
Figure 9:
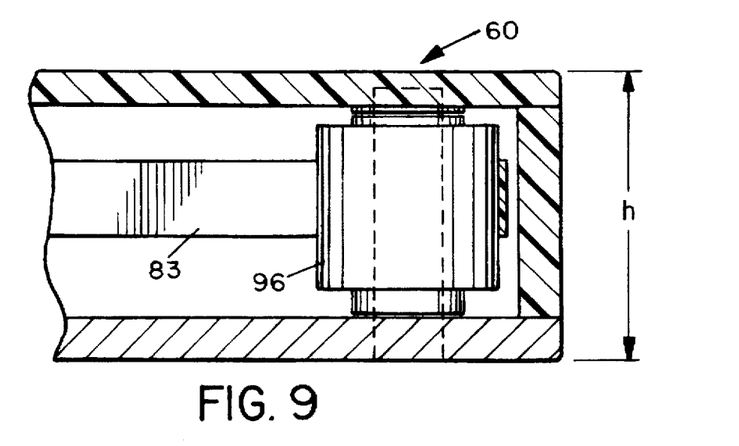
FIG. 9 is an enlarged sectional view taken on line 9—9 of FIG. 2.
Figure 10:
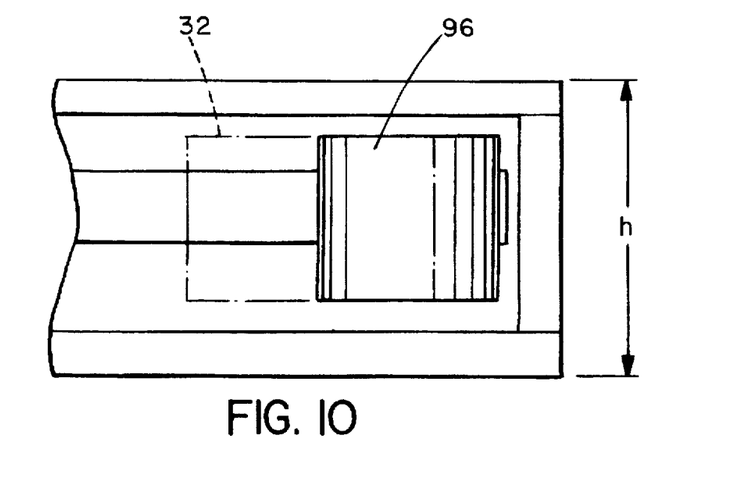
FIG. 10 shows elements of FIGS. 8 and 9 superimposed.

Reference is now made to FIGS. 8, 9, and 10. FIGS. 8 and 9 show a sectional view taken along lines 8—8 and 9—9, respectively. Each sectional shows the relationship of each respective belt guide roller to the height of each respective cartridge. For example, FIG. 8 shows the relationship of belt guide roller 32 to the height h of the prior art cartridge. On the other hand, FIG. 9 shows the relationship of belt guide roller 96 to the height h (the heights of both cartridges is identical in order to interface with the drive) of the new cartridge. FIG. 10 shows these sectional views superimposed to demonstrate that the new belt guide roller base area $\pi(R2)^2$ is much smaller compared to the cartridge height h (which is equal for both cartridges) compared to the prior art belt guide roller base area $\pi(R1)^2$. The ratio $\pi(R2)^2$ to height h is smaller than the ratio of prior art $\pi(R1)^2$ to height h. Preferably h is about 0.58 inches.

Another useful way of viewing the advantages of this invention are in terms of this height. Disregarding units, the ratio of the numerical value of the area $\pi(R2)^2$ to height h is about 1:1.2, i.e. the area is about 0.48 and the height is about 0.58. The same prior art ratio, of $\pi(R1)^2$ to height is about 1:1. Again, one skilled in the art should recognize the savings in space in the cartridge that is now available for storing tape.

Still another useful comparison is the height of the cartridge to the diameter (2 times R3) of the circular shaped portion 81 that at least in part contacts belt 83, which in a preferred embodiment has a ratio of about 3.8 to 1. A similar ratio of the same height to the diameter of circular portion 27 of the prior art is about 3 to 1.

A cartridge with a housing substantially identical in size to an industry standard but with substantially more tape capacity has been shown. Modifications may occur to those skilled in the art in view of the teachings above. Therefore this invention is only to be limited by the claims appended below and their equivalents.

What is claimed is:

1. A data storage tape cartridge positionable in a drive having drive means, the cartridge comprising:

a cover having a front, back, top, and first and second sides, each of the first and second side having at least a front section and a back section that is offset from the front section by an offset section disposed between the front and back sections, wherein the distance between the first side's back section to the second side's back section is wider than the distance between the first side's front section to the second side's front section;

a base plate having a front and a back being of substantially equal width, and a first and second side being of substantially equal length, the base plate further having a top surface, the base plate top surface having mounted to it the cover with the front of the cover substantially aligned with the front of the base plate and the back of the cover substantially aligned with the back of the base plate, the cover and the base plate forming a housing having a front formed at the front of the base plate and the front of the cover, the housing having a height whereby the cartridge is sized to fit in the drive;

a media access opening formed in the front of the housing;

a drive opening formed in the front of the housing;

two hubs rotatably mounted on the base plate in the housing, each hub having a respective center axis that is parallel to the other hub's respective center axis, and each hub being disposed such that at least one cover side offset section is located between the front of the housing and a straight line passing parallel to the housing front and passing from the first and second side of the baseplate through the hub center axis of both hubs;

tape media wrapped around the two hubs in the housing to form two tape packs, the tape media being accessible from the outside of the housing through the media access opening;

a belt driving roller rotatably mounted in the housing at the front of the base plate and accessible to the drive means through the drive opening;

a pair of belt guide rollers rotatably mounted in the housing at the rear of the base plate; and an elastic belt wrapped around the belt driving roller, belt guide rollers, and the two tape packs for rotating the hubs in response to rotation of the belt driving roller by the drive means.

2. The data storage tape cartridge of claim 1, wherein each back section of each side of the cover includes an interior arcuate indentation region that is curved for receiving tape media therein.

3. The data storage tape cartridge of claim 1, wherein the base plate includes a notch disposed proximate to the base plate front on each respective base side, and the base plate top surface is mounted to the cover such that at least a portion of each front section of each cover side is disposed adjacent the notch.

4. The data storage tape cartridge of claim 1, wherein the belt driving roller has a circular shaped portion that at least in part contacts the belt and wherein the ratio of the height of the cartridge to the diameter of the circular shaped portion is about 3.8:1.

5. The data storage tape cartridge of claim 1, wherein the length and width of the baseplate are substantially equal to a corresponding second length and a corresponding second width of a second base plate of a second cartridge defined by an industry standard for a data cartridge, the industry standard defining the second data cartridge being denoted as the QIC development standard QIC-153 revision D.

6. The data storage tape cartridge of claim 5, wherein an overall length of the tape media that may be accommodated in the cartridge housing is more than 10% greater than the overall length of tape media that may be accommodated in a second housing of the second data cartridge.

7. The data storage tape cartridge of claim 6, wherein the overall length of the tape media that may be accommodated in the cartridge housing is approximately about 50% greater than the overall length of tape media that may be accommodated in a second housing of the second data cartridge.

8. The data storage tape cartridge of claim 5, wherein an overall length of the tape media that may be accommodated in the cartridge housing is about 625 ft.

9. The data storage tape cartridge of claim 5, wherein an overall length of the tape media that may be accommodated in the cartridge housing is about 625 ft.

10. The data storage tape cartridge of claim 5, wherein an overall length of the tape media that may be accommodated in the cartridge housing is more than 10% greater than the overall length of tape media that may be accommodated in a second housing of the second data cartridge.

11. The data storage tape cartridge of claim 10, wherein the overall length of the tape media that may be accommodated in the cartridge housing is approximately about 50% greater than the overall length of tape media that may be accommodated in a second housing of the second data cartridge.

12. The data storage tape cartridge of claim 1, wherein the pair of belt guide rollers are disposed proximate to the back of the housing and each belt guide roller has a circular shaped portion that at least in part contacts the belt, wherein a ratio of the area of the circular shaped portion to the height of the cartridge is about 1:5.

13. The data storage tape cartridge of claim 1, wherein the pair of belt guide rollers are disposed proximate to the back of the housing and each belt guide roller has a circular shaped portion that at least in part contacts the belt, wherein the ratio of the area of the circular shaped portion that contacts the belt to the width of the base plate is about 1:6.

14. The data storage tape cartridge of claim 13, and further comprising:

a pair of guide pins, each defining a respective center of each belt guide roller of the pair of belt guide rollers; and a pair of openings in the base plate proximate to the back of the base plate, each opening for receiving a respective guide pin of the pair of guide pins for coupling each belt guide roller to the base plate, wherein each opening is disposed so that each coupled belt guide roller is located closer to the back of the base plate and closer to a nearest located side of the base plate sides in comparison to a location of a belt guide roller of a pair of belt guide rollers disposed in the housing of the second data cartridge.

15. A data storage tape cartridge positionable in a drive having drive means, the cartridge comprising:

a cover having a front, back, top, and first and second sides, at least one of the first or second side having at least a front section and a back section that is offset from the front section by an offset section disposed between the front and back sections, wherein the distance between the first side's back section to the second side's back section is wider than the distance between the first side's front section to the second side's front section;

a base plate having a front and a back being of substantially equal width, and a first and second side being of substantially equal length, the base plate further having a top surface, the base plate top surface having mounted to it the cover, the front and back of the cover being substantially aligned with the front and back of the base plate respectively the cover and base plate forming a housing having a front at the front of the base plate and the front of the cover, the housing having a height whereby the cartridge is sized to fit in the drive;

a media access opening formed in the front of the housing;

a drive opening formed in the front of the housing;

two hubs rotatably mounted on the base plate in the housing, each hub having a respective center axis that is parallel to the other hub's respective center axis, and each hub being disposed such that said at least one cover side offset section is located between the front of the housing and a straight line passing parallel to the housing front and passing from the first and second side of the baseplate through a hub center axis of each hub disposed proximate to the front of the housing;

tape media wrapped around the two hubs in the housing to form two tape packs, the tape media being accessible from the outside of the housing through the media access opening;

a belt driving roller rotatably mounted in the housing at the front of the base plate and accessible to the drive means through the drive opening;

a pair of belt guide rollers rotatably mounted in the housing at the rear of the base plate; and an elastic belt wrapped around the belt driving roller, belt guide rollers, and the two tape packs for rotating the hubs in response to rotation of the belt driving roller by the drive means.

16. The data cartridge of claim 15, wherein both the first and second sides include side offset sections and each hub is disposed such that each cover side offset section of the two cover side offset sections is located between the front of the housing and the straight line passing parallel to the housing front and passing from the first and second side of the baseplate through a hub center axis of each hub.

17. The data cartridge of claim 15, wherein a back section of only one side of the cover includes an interior arcuate indentation region that is curved for receiving tape media therein.

18. The data storage tape cartridge of claim 15, wherein the base plate includes a notch disposed proximate to the base plate front on only one base side, and the base plate top surface is mounted to the cover such that at least a portion of a front section of a cover side is disposed adjacent the notch.

19. A data storage tape cartridge positionable in a drive having drive means, the cartridge comprising:

a cover having a front, back, top, and first and second sides, a base plate having a front and a back being of substantially equal width, and a first and second side being of substantially equal length, base plate further having a top surface, the base plate top surface having mounted to it the cover to form a housing having a front defined by the front of the base plate and the front of the cover;

a media access opening formed in the front of the housing;

a drive opening formed in the front of the housing;

two hubs rotatably mounted in the housing, each hub having a respective center axis that is parallel to the other hub's respective center axis;

tape media wrapped around the two hubs in the housing to form two tape packs, the tape media being accessible from the outside of the housing through the media access opening;

a belt driving roller rotatably mounted in the housing and accessible to the drive means through the drive opening;

a pair of belt guide rollers rotatably mounted in the housing, wherein the pair of belt guide rollers are disposed proximate to the back of the housing and each belt guide roller has a circular shaped portion that at least in part contacts the belt, wherein the ratio of the area of the circular shaped portion that contacts the belt to the height of the cartridge is about 1:1.2; and an elastic belt wrapped around the belt driving roller, belt guide rollers, and the two tape packs for rotating the hubs in response to rotation of the belt driving roller by the drive means.

20. A data storage tape cartridge positionable in a drive having drive means, the cartridge comprising:

a cover having a front, back, top, and first and second sides, a base plate having a front and a back being of substantially equal width, and a first and second side being of substantially equal length, the base plate further having a top surface, the base plate top surface having mounted to it the cover to form a housing having a front defined by the front of the base plate and the front of the cover, the housing having a height whereby the cartridge is sized to fit in the drive;

a media access opening formed in the front of the housing;

a drive opening formed in the front of the housing;

two hubs rotatably mounted in the housing, each hub having a respective center axis that is parallel to the other hub's respective center axis;

tape media wrapped around the two hubs in the housing to form two tape packs, the tape media being accessible from the outside of the housing through the media access opening;

a belt driving roller rotatably mounted in the housing and accessible to the drive means through the drive opening;

a pair of belt guide rollers rotatably mounted in the housing, wherein the pair of belt guide rollers are disposed proximate to the back of the housing and each belt guide roller has a circular shaped portion that at least in part contacts the belt, wherein the ratio of the area of the circular shaped portion to the width of the base plate is about 1:6; and an elastic belt wrapped around the belt driving roller, belt guide rollers, and the two tape packs for rotating the hubs in response to rotation of the belt driving roller by the drive means.

21. A housing for a data storage tape cartridge positionable in a drive having drive means, wherein the tape cartridge includes two hubs rotatably mounted in the housing, each hub having a respective center axis that is aligned with the other hub's respective center axis, the housing comprising:

a cover having a front, back, top, and first and second sides, each of the first and second side having at least a front section and a back section that is offset from the front section by an offset section disposed between the front and back sections, wherein the distance between the first side's back section to the second side's back section is wider than the distance between the first side's front section to the second side's front section;

a base plate having a front and a back being of substantially equal width, and a first and second side being of substantially equal length, the base plate further having a top surface, the base plate top surface having mounted to it the cover, the front and back of the base plate being located at the front and back of the cover, respectively, and the cover and base plate forming a housing having a front defined by the front of the base plate and the front of the cover, the housing having a height whereby the cartridge is sized to fit in the drive; and wherein at least one cover side offset section is located between the front of the housing and a straight line passing parallel to the housing front and passing from the first and second side of the baseplate through the hub center axis of each hub disposed proximate to the front of the housing.

22. The data storage tape cartridge of claim 21, wherein the base plate includes a notch disposed proximate to the base plate front on each respective base side, and the base plate top surface is mounted to the cover such that at least a portion of each front section of each cover side is disposed adjacent the notch.

23. The data storage tape cartridge of claim 21, wherein the straight line passing parallel to the housing front passes through each respective hub center axis.

24. The data storage tape cartridge of claim 21, wherein the length and width of the baseplate are substantially equal to a corresponding second length and a corresponding second width of a second base plate of a second cartridge defined by an industry standard for a data cartridge, the industry standard being denoted as the QIC-153 revision D.

25. The data storage tape cartridge of claim 21, wherein an overall length of the tape media that may be accommodated in the cartridge housing is more than 10% greater than the overall length of tape media that may be accommodated in a second housing of the second data cartridge.

26. The data storage tape cartridge of claim 25, wherein the overall length of the tape media that may be accommodated in the cartridge housing is approximately about 50% greater than the overall length of tape media that may be accommodated in a second housing of the second data cartridge.

27. The data storage tape cartridge of claim 21, wherein an overall length of the tape media that may be accommodated in the cartridge housing is about 625 ft.

* * * * *